United States Patent [19]

Towsley

[11] Patent Number: 4,971,366
[45] Date of Patent: Nov. 20, 1990

[54] PLASTIC PIPE FITTING

[76] Inventor: Bryan L. Towsley, 1456 Kiowa Trail, Elizabeth, Colo. 80107

[21] Appl. No.: 389,251

[22] Filed: Aug. 2, 1989

[51] Int. Cl.⁵ .............................................. F16L 25/00
[52] U.S. Cl. ...................................... 285/12; 285/156; 285/175; 285/177; 285/179; 285/423
[58] Field of Search ................. 285/156, 239, 177, 12, 285/179, 423

[56] References Cited

U.S. PATENT DOCUMENTS

| 432,248 | 7/1890 | Rinman . | |
|---|---|---|---|
| 3,551,007 | 12/1970 | Martin et al. | 285/156 |
| 3,759,445 | 9/1973 | King | 285/5 X |
| 4,238,131 | 12/1980 | Cleveland | 285/156 X |
| 4,266,813 | 3/1981 | Oliver | 285/12 |
| 4,688,832 | 4/1987 | Ortloff et al. | 285/175 |
| 4,712,812 | 12/1987 | Weir | 285/177 |
| 4,774,940 | 10/1988 | Linder | 128/204.18 |
| 4,779,904 | 8/1988 | Rich | 285/345 |
| 4,796,928 | 11/1989 | Carlin et al. | 285/334 |

FOREIGN PATENT DOCUMENTS

| 138042 | 12/1947 | Australia | 285/156 |
|---|---|---|---|
| 2934098 | 3/1981 | Fed. Rep. of Germany | 285/156 |
| 2288930 | 5/1976 | France | 285/239 |

Primary Examiner—Dave W. Arola
Attorney, Agent, or Firm—Norvell E. Von Behren

[57] ABSTRACT

A plastic pipe fitting for use in an underground water sprinkler system. The fitting design uses multi-thread internal pipe threads on various types of fittings such as elbows, T's, side outlet 90° fittings and side outlet T's among other types. The multi-thread design permits at least two sizes of sprinkler heads to be connected as desired into the fitting. An improved inlet barb connection may also be used on the above fittings and on other types of pipe fittings used in the entire water sprinkler system to prevent improper clamping of connecting pipe on the inlet barbs.

13 Claims, 3 Drawing Sheets

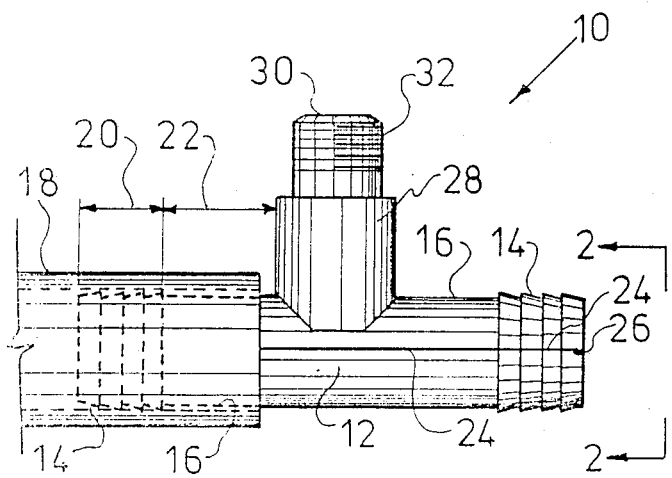
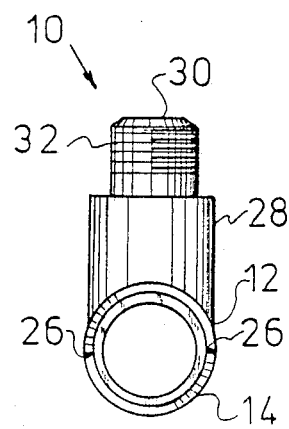
FIG-1
PRIOR ART
FIG-2
PRIOR ART
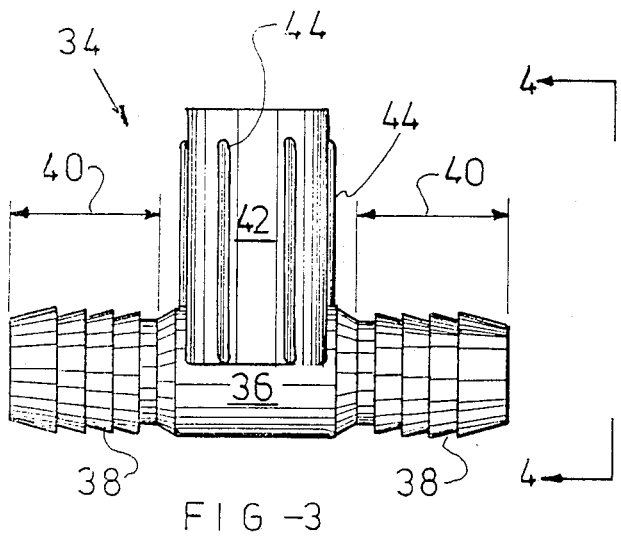
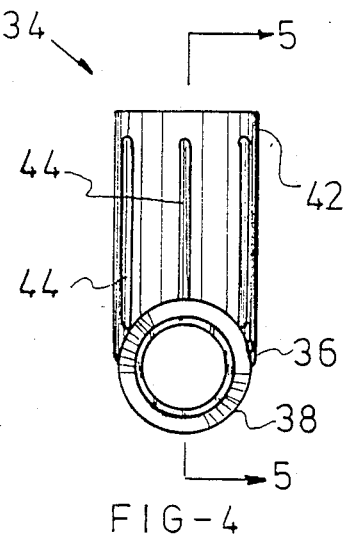
FIG-3
FIG-4
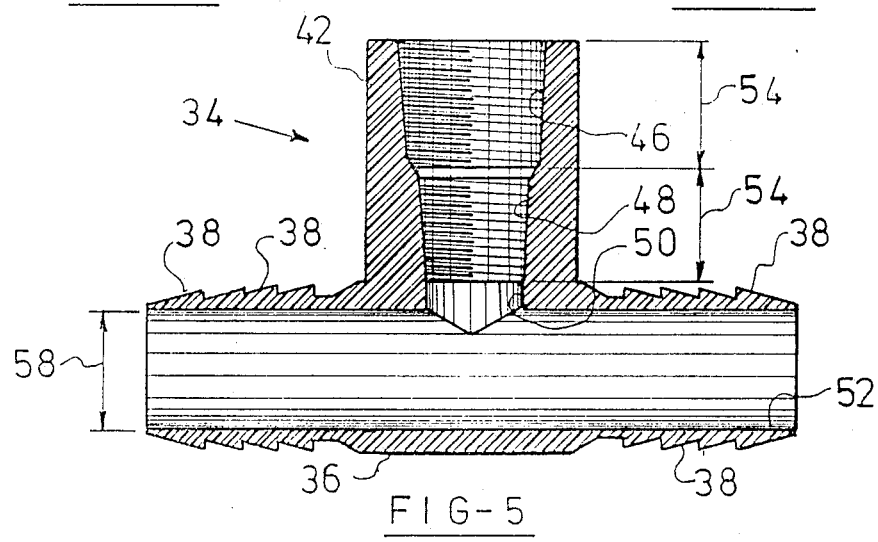
FIG-5

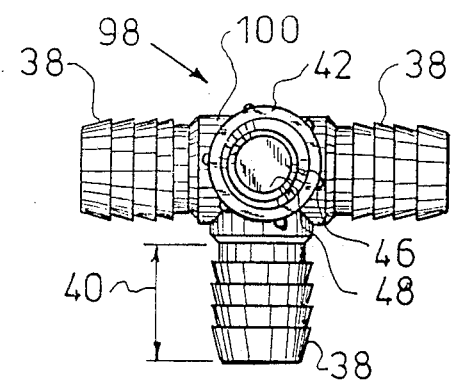
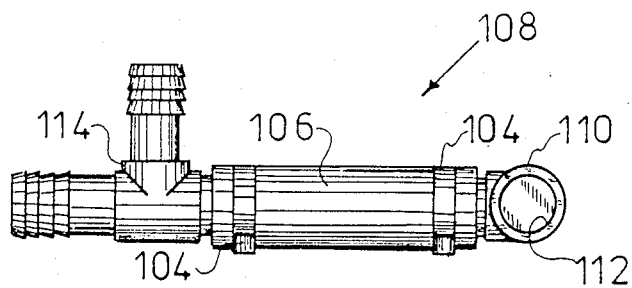
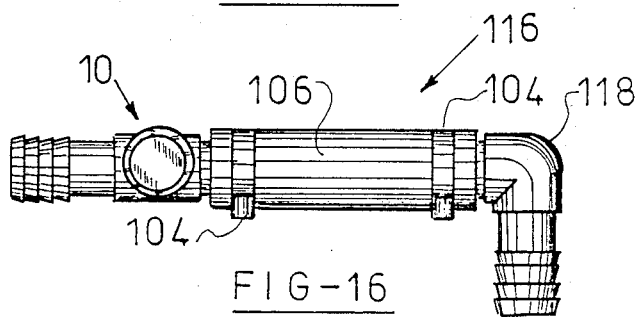
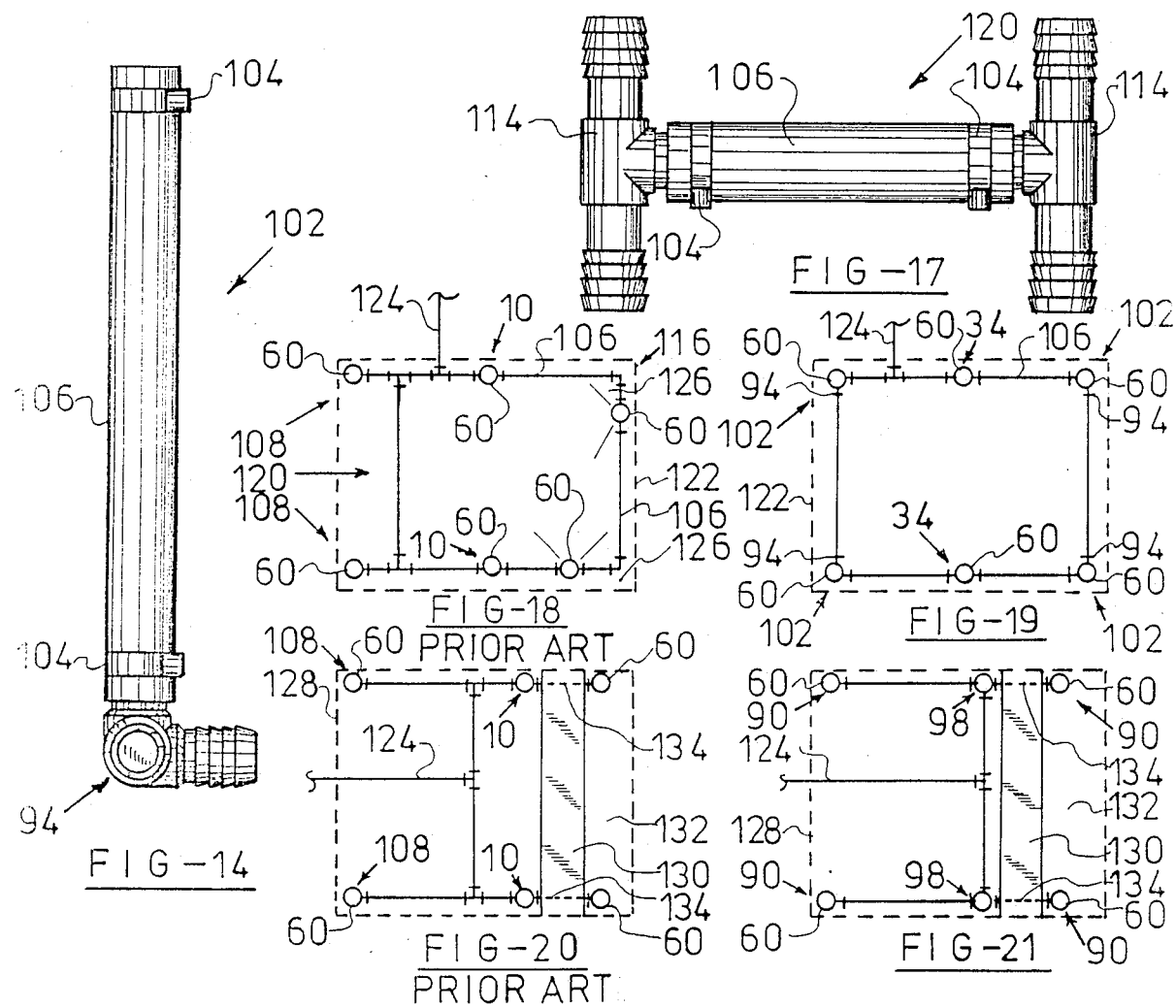

PLASTIC PIPE FITTING

CROSS REFERENCE TO RELATED PATENT APPLICATIONS

Design Patent Application, Ser. No. 07/325,502, Filed Mar. 20, 1989, by Bryan L. Towsley and entitled Sprinkler Side Outlet 90 Degree Fitting.

BACKGROUND OF THE INVENTION

This invention relates generally to plastic pipe fittings and in particular to a new and novel design for a plastic pipe fitting for use in underground water sprinkling systems where the fitting is attached to sprinkler heads of different sizes.

In the layout of underground water sprinkling systems it is common to use different sizes of pop-up sprinkler heads, depending upon the area needed for water coverage. Smaller ½ inch sprinkler heads are usually used for the small areas up to a 15 foot throw and usually contain stationary heads with set spray patterns. These smaller sprays can distribute approximately 0.9 gallons per minute of water up to 3 gallons per minute and are manufactured by Toro Corp., Rainbird Manufacturing Company and Hunter Heads Company, among others.

Larger ¾ inch sprinkler heads are usually used for larger areas and generally have oscillating heads that can spray water to a distance of 41 feet to 60 feet and are also capable of 360° rotation. The larger sprinkler heads can distribute approximately 3 gallons per minute of water up to 6 gallons per minute and are manufactured by the same companies that manufacture the smaller heads.

Since it is common to have some layouts which require all small sprinkler heads and other layouts which may require all large heads or a mixture of both, the installer of the sprinkling system needs to have a supply of both sizes of sprinkler heads as well as attaching pipe fittings. In addition the distributor must also stock these dual sizes of sprinkler heads and fittings for the purchasing public, which results in large stocks of inventory to both. It would be advantageous to be able to manufacture, distribute and use only one attaching pipe fitting which could be used with both the large as well as small sprinkler heads.

It would also be advantageous to have several types of attaching pipe fittings which are capable of being used to replace a variety of fitting connections to thereby reduce installation time and cost of the entire system.

The normal pipe fittings that are used to attach to the various sizes of sprinkler heads are generally sized for a ½ inch or ¾ inch outlet, according to the size of sprinkler head used and all contain nominal 1 inch O.D. connecting barbed inlets. Plastic pipe is then positioned over the barbed inlets and held tightly on the barbs by a stainless steel clamp or other means. Since the prior art type attaching pipe fittings are manufactured with a large space between the last barb and the central body of the fitting, it is not uncommon to accidentally clamp the plastic pipe in the non-barbed area. When this occurs, the fitting will usually blow apart when water pressure is applied since the prior art type fittings are designed to be clamped over the barbed area. It would be desirable to have a pipe fitting that would be foolproof in that the installer would not be able to accidentally clamp the pipe fitting in the wrong area.

A prior art pre-examination patent search of dual type fittings was conducted in class 285, subclasses 175, 177 and 390. The U.S. Pat. No. #432,248 issued to G.O. Rinman teaches the use of multiple internal threads on a coupling nut to engage different size pipe threads at the same time for two pipes.

The U.S. Pat. No. #4,688,832 issued to Donald J. Ortloff teaches the use of double internal threads in oil drill pipe to provide a means for prestressing the joint to uniformly distribute the forces throughout the coupling joint. A similar type of design is taught in the U.S. Pat. No. #4,796,928 issued to Frank J. Carlin et al and uses a particular configuration on a two-step internal thread to eliminate variations in tensile strength caused by wall thickness variations.

Multiple straight female internal bores of different sizes are taught in the U.S. Pat. No. #4,774,940 issued to Gerald S. Linder in connection with a medical breathing circuit connector. The internal bores have slightly different diameters of approximately 0.1 millimeters to enable the unit to seat on the mating input section thereby reducing the internal forces that cause the coupling to disconnect.

A multiple sized male connection for attaching to a vehicle exhaust pipe is taught in the U.S. Pat. No. #4,779,904 issued to Christopher K. Rich. The connection is externally ribbed to assist in retaining different diameters of exhaust conduit.

The U.S. Pat. No. #4,266,813 issued to Robert D. Oliver teaches a universal coupler for use on a recreational vehicle to permit different type bottles of liquids, such as chlorine, antifreeze or the like, to be added to a water system for cleanout purposes. A plurality of different sizes and types of female threads are used in the design.

SUMMARY OF THE INVENTION

In order to overcome the problems inherent in the prior art pipe fittings and in prior art designs, there has been provided by the subject invention, a new and novel plastic pipe fitting that is designed to accept at least two sizes of sprinkler heads such as the ½ inch and ¾ inch sizes common in the marketplace. The pipe fitting uses a multi-thread internal female construction with the ½ inch size being formed below the ¾ inch size.

This multi-thread design can be used in combination with elbows, T's, side outlet 90° fittings and side outlet T's as well as other possible combinations. The inlet or inlets on the various fittings are constructed with attaching barbs around which are positioned and clamped the plastic pipe used to carry the water for the sprinkler heads. The barbs on the inlet have been extended to close proximity to the central body of the fitting so that the outer plastic pipe may be clamped along the entire barb distance. This improvement prevents accidental clamping along a non-barbed portion of the fitting as is common with prior art fittings.

The extended barb inlet design may also be used with regular fittings designed for positioning in the main or branch circuits of the sprinkler system within the spirit and scope of the invention.

Accordingly it is an object and advantage of the invention to provide a new and novel improved plastic pipe fitting which contains a multi-thread internal construction for connection to at least two different sizes of water sprinkler heads.

Another object and advantage of the invention is to provide a new and novel improved plastic pipe fitting that may be made in various configurations to permit a 50% reduction in pipe fitting inventory of the manufacturer, distributor and installer of the water sprinkler system.

Yet another object and advantage of the invention is to provide a new and novel improved plastic pipe fitting design that automatically prevents accidental improper clamping of outer plastic pipe on the plastic pipe fitting during installation of a water sprinkler system, thereby preventing blowouts of the system at the improper clamped area.

Still yet another object and advantage of the invention is to provide a new and novel improved design of a plastic pipe fitting that may be used throughout the entire water sprinkler system that permits quick and easy installation of the system by the installer, thereby improving the profits of the installer.

These and other objects and advantages will be apparent after a review of the drawings and a reading of the preferred embodiment following hereinafter, which are shown and described by way of illustration only.

BRIEF DESCRIPTION OF THE DRAWINGS

FIG. 1 is a side elevational view of a typical prior art T-fitting showing a piece of plastic pipe positioned over the left inlet connection.

FIG. 2 is an end elevational view, taken along line 2—2 of FIG. 1.

FIG. 3 is a side elevational view of the applicant's novel design formed as a T-fitting.

FIG. 4 is an end elevational view, taken along line 4—4 of FIG. 3.

FIG. 5 is a cross-sectional view, taken along line 5—5 of FIG. 4.

FIG. 13 is a top plan view, taken along line 13—13 of FIG. 12.

FIG. 14 is a plan view of a basic fitting unit for a sprinkler installation using the applicant's novel design.

FIGS. 15-17 are plan views of these basic fitting units for a sprinkler installation using prior art type fittings.

FIG. 18 is a plan view of a typical yard area using prior art fittings.

FIG. 19 is a plan view of the same yard area of FIG. 18 using the applicant's novel fittings.

FIG. 20 is a plan view of another yard area using prior art fittings.

FIG. 21 is a plan view of the same yard area of FIG. 20 using the applicant's novel fitting.

DESCRIPTION OF THE PREFERRED EMBODIMENT

Figure 6:
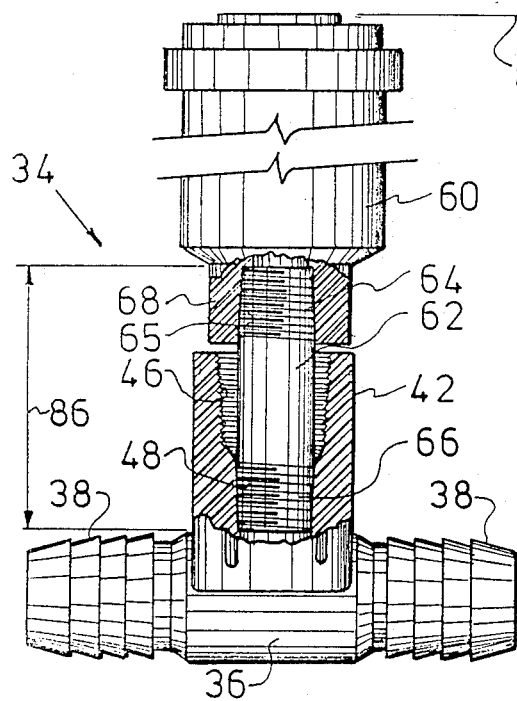
FIG. 6 is a partial cross-sectional side elevational view, similar to the view of FIG. 3 showing a ½ inch water sprinkler head attached to the applicant's fitting.

Referring now to the drawings in general and specifically to FIGS. 1 and 2 of the drawings, there is shown generally by the numeral 10 a typical prior art type T-fitting, having a central body portion 12 and a pair of barbed inlet portions 14 formed thereon. The T-fitting 10 is designed to receive a plastic pipe 18 such as is shown on the left side of the view.

The pipe 18 is tightly clamped over the barbs 14 along the clamping space, shown by the numeral 20 when properly installed. Various clamps such as stainless steel types and others may be used and the clamp is omitted in the view for purposes of clarity. As long as the clamp is positioned and tightened in the clamping area 20, the fitting 10 will be leak-proof. However, should the clamp be accidentally positioned along the non-clamping area shown by the numeral 22, the fitting will generally not be leakproof and in fact, the pipe 18 will often blow off of the fitting 10 whenever water pressure is applied to the sprinkling system.

Prior art type fittings 10 are also usually formed by a manufacturing process which leaves a parting line 24 along which flash 26 can form. The flash, if not removed in the manufacturing process, can interfere with the positioning of the plastic pipe 18 over the fitting 10, and also can cause leakage around the flash area. The barbs 14 are formed a distance away from the outlet 28.

Formed above the central body 12 is a female outlet 28, having a single internal pipe thread sized to attach the fitting 10 to either the ½ inch diameter sprinkler head or the ¾ inch diameter sprinkler head. The attachment is made by using a cutoff nipple 30 or standard elongated nipple of the type common in the marketplace. The nipple 30 contains a male thread 32 which is screwed into a mating size female inlet on the bottom of the water sprinkler head.

FIG. 2 is a view, taken along line 2—2 of FIG. 1 and shows in more detail the prior art type fitting. Other constructions are used in this general design such as elbows, crosses, etc., and all have the barbed clamping area 20 extended from the central body 12 leaving the non-clamping area 22 between the barbs 14 and the central body around the circumference 16.

Referring now to FIGS. 3 and 4 there is shown the applicant's novel design improvement generally by the numeral 34 which is formed and shown in FIGS. 3 and 4 as a T-fitting. A central body 36 has a pair of barbed inlets 38 formed on the central body. The barbed inlets 38 are formed in juxtaposition to the central body 30 so that an elongated clamping area 40 is utilized and no non-clamping area is formed. This makes the applicant's fitting virtually fool-proof, since the fitting can not be accidentally clamped in a non-clamping area such as the area 22 used in the prior art fitting shown in FIGS. 1 and 2.

Formed on the upper portion of the applicant's T-fitting 34 is a dual female outlet 42 to which may be attached either a ½ inch or a ¾ inch water sprinkler head. Ribs 44 are also formed around the outer circumference of the outlet 42. FIG. 4 is a view, taken along line 4-4 of FIG. 3, and shows in more detail the placement of the ribs 44 around the outer circumference of the outlet 42. The ribs 44 are for appearance purposes and also strengthen the outlet 42.

Referring now to FIG. 5, there is shown an enlarged cross-sectional view, taken along line 5—5 of FIG. 4 and there can be seen the construction of the dual female outlet 42. Formed in the upper portion of the outlet 42 is the ¾ inch female pipe thread 46 and immediately below is formed the ½ inch female pipe thread 48. An internal bore 50 connects to the female pipe thread 48 and also to the elongated bore 52 which runs through both barbed outlets 38 as well as the central body 36.

In the typical T-fitting 34 shown in FIG. 5, the length of the ¾ inch internal pipe thread 46 would be approximately 0.8 inch as shown by the numeral 54 while the length of the ½ inch internal pipe thread 48 would also be approximately 0.8 inch. The internal diameter of the bore 52 would be approximately 0.8 inch also as shown by the numeral 58 in FIG. 5.

Figure 7:
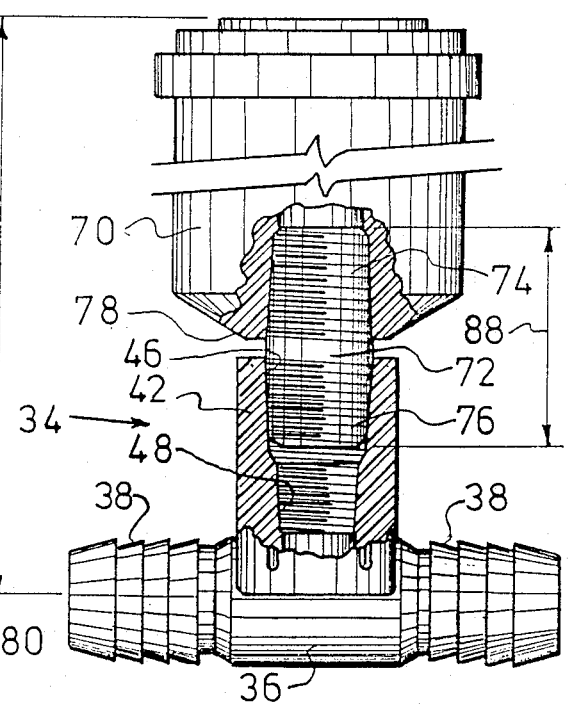
FIG. 7 is a partial cross-sectional side elevational view, similar to the view of FIG. 6 showing a ¾ inch water sprinkler head attached to the applicant's fitting.

Referring now to FIGS. 6 and 7 of the drawings there are shown side elevational views, partly in cross section, with two different size sprinkler heads attached to the device 38. In FIG. 6 there is shown a ½ inch water sprinkler head 60 which is screwed into a nipple 62 using the male thread 64 on the end of the nipple and the female thread 65 contained within the sprinkler head 60.

The nipple 62 also contains a male pipe thread 66 on the other end thereof which is screwed into the female pipe thread 48 formed as before mentioned. It can then be seen how the lower end 68 of the sprinker head 60 can be raised or lowered to the proper position by varying the length of the nipple 62 or by using a cutoff nipple of the type commonly used.

It can also be seen in FIG. 6 how the upper ¾ inch female pipe thread 46 is not used when a small ½ inch sprinkler head 60 is used in the system. FIG. 7 shows the condition of the applicant's fitting when it is used with a large water sprinkler head 70. Here a shorter pipe nipple 72 or a cutoff nipple would be used to screw the larger ¾ inch sprinkler head 70 into the fitting. The nipple 72 would contain two male pipe threads 74 and 76 on each end which would be screwed into the lower end 78 of the sprinkler head and into the upper female pipe thread 46 contained in the dual female outlet 42.

When a large sprinkler head 70 is used in this manner, the lower ½ inch female pipe thread 48 is not used as can clearly be seen in FIG. 7. From studying FIGS. 6 and 7 it should readily be apparent that only one size attaching fitting 34 need be stocked by the installer, the retail outlet and the distributor, resulting in a 50% inventory reduction for those particular fittings.

When installing either the small sprinkler head 60 or the large sprinkler head 70, it is preferable to install them so that the top of the heads 82 would be installed at ground level with the center line 80 of the fitting 34 being approximately 12 to 15 inches below ground or more, depending on the area, as shown by the numeral 84 between FIGS. 6 and 7. Since the depth of the water lines is not always easy to control, then the adjustment of the sprinkler head height can be made by varying the length of the nipples 62 or 72 which is shown by the numerals 86 and 88 or by using cutoff nipples as before mentioned.

Figure 8:
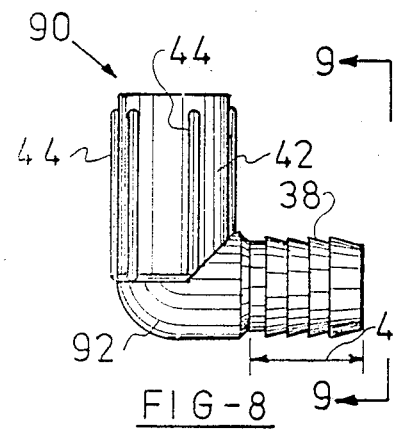
FIG. 8 is a side elevational view of an elbow fitting formed in the applicant's novel design.
Figure 9:
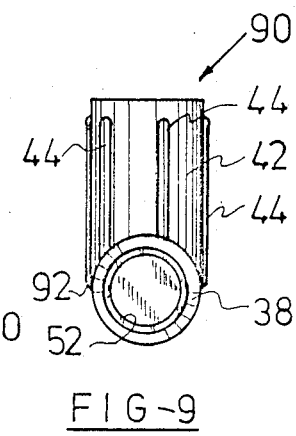
FIG. 9 is an end elevational view, taken along line 9—9 of FIG. 8.

There will now be described some of the other configurations of fittings that can be used with the novel dual female outlet 42 to provide more flexibility to the installer in putting in the entire sprinkler system and in further reducing his fitting inventory. FIGS. 8 and 9 show an improved elbow fitting, generally by the numeral 90 which has a central body 92 connecting a barbed inlet 38 to a dual female outlet 42, both of the type before described. The internal bore 52 runs throughout the elbow central body 92 and the barbed inlet 38 and connects to the dual female threads 48 and 46 in a manner similar to the T-fitting 34 of FIGS. 3 and 4.

It should also be noted that the barbed inlet 38 extends to the central body 92, leaving a total clamping area 40 and no non-clamping area, similar to the area 22 on the prior art fitting 10 shown in FIGS. 1 and 2. This then makes the elbow 90 configuration fool-proof in that it can not be improperly clamped.

Figure 10:
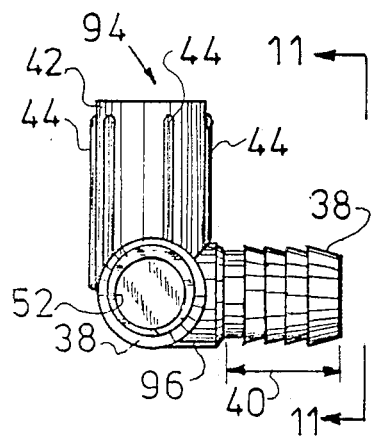
FIG. 10 is a side elevational view of a 90° side outlet fitting formed in the applicant's novel design.
Figure 11:
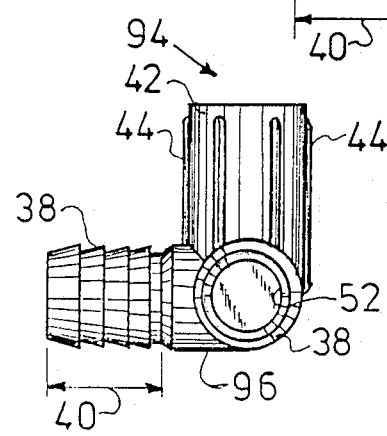
FIG. 11 is an end elevational view, taken along line 11—11 of FIG. 10.

FIGS. 10 and 11 show another configuration of a fitting where there is shown generally by the numeral 94, a 90°side outlet fitting which comprises a central body 96 having an internal bore 52. The central body 96 is connected to two barbed inlet connections 38 which also contain an internal bore 52. The bores 52 are all connected to the small female pipe threads 48 and 46 formed in the dual female outlet 42.

The use of the 90°side outlet fitting permits the installer to position the fitting in a corner for attaching to a corner sprinkler head and saves installation time, instead of having to construct a special setup to place the corner sprinkler head, as will be described more fully hereinafter. Since a landscaper will normally charge Twenty-five Dollars ($25) per hour per man for installation time, savings of up to one-third of installation time can be obtained using the applicant's novel fittings of the type shown and described.

It should also be noted that the 90°side outlet fitting 94, shown in FIGS. 10 and 11, also contains the improved barbed inlet 38 with the lengthened clamping areas 40 as before described. This fitting is then also a foolproof fitting in that it can be clamped anywhere since it does not contain a non-clamping area such as the area 22 on the prior art T-fitting of FIGS. 1 and 2.

Figure 12:
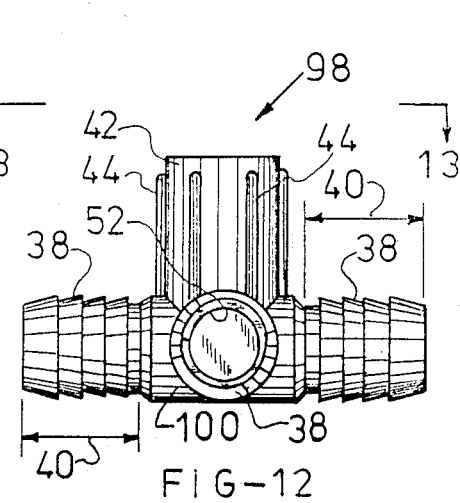
FIG. 12 is a side elevational view of a side outlet T-fitting formed in the applicant's novel design.

Referring now to FIGS. 12 and 13 there are shown two views of another novel configuration of the applicant's invention wherein a side outlet T-fitting 98 is formed with a central body 100 which connects to three similar barbed inlet connections 38 having internal bores 52 connecting to the internal bore 52 in the central body. The side outlet T-fitting 98 also contains the novel dual thread outlet 42 of the type before described having the smaller female thread 48 and the larger female thread 46 of the type as before described.

The novel side outlet T-fitting 98 also may contain the improved elongated barb 38 which makes the fitting foolproof since it has clamping areas 40 extending to the central body 100.

The four types of fittings shown and described hereinbefore are the usual ones that are used by an installer of the sprinkling system. It is within the spirit and scope of the invention that other types of fittings can be improved by using the applicant's novel dual thread outlet 42 and/or the novel elongated barb 38 extending to the central body. For example it may be desirable to use the novel elongated barb 38 on fittings such as conventional T's, elbows, crosses, etc. that would not have the novel dual thread outlet 42 formed on the top thereof. In addition it may also be desired to have fittings only with the novel dual outlet 42 with prior art type barbed inlet connections 14 of the type shown in FIGS. 1 and 2. While it is felt these would not be as desirable, they are considered to be within the spirit and scope of the invention.

Referring now to FIGS. 14-21 there will be described in more detail how the applicant's novel fittings, of the types shown in FIGS. 3-13, can be used in a basic unit to handle most sprinkler applications. FIG. 14 is a plan view of the basic fitting unit using a 90° side outlet fitting 94 and is shown generally by the numeral 102. The applicant's basic unit would comprise a pair of pipe clamps 104 and one of his four novel fittings which would then be attached to various lengths of plastic pipe 106 on installation in a yard sprinkler system.

While in FIG. 14 only the 90° side outlet fitting is shown as a basic unit, one of the other three novel fittings could also be used such as the T-fitting 34 (FIGS. 3–5), the elbow fitting 90 (FIGS. 8–9) and the side outlet T-fitting 98 (FIGS. 12–13). The versatility of the applicant's basic unit will be more apparent hereinafter when referring to FIGS. 18–21 of the drawings which show prior art installations and the applicant's installations in a side-by-side comparison. The cost of the applicant's basic unit 102, without the plastic pipe 106, would be approximately One Dollar and Eighty-five Cents ($1.85) in a 1 inch size for use with 1 inch plastic pipe 106.

When using prior art type fittings it should be understood that only elbows and T-fittings (such as FIGS. 1–2) are available for attachment to sprinkler heads. These must be Purchased with either ½ inch or ¾ inch outlets. Since only two types are available, various prior art basic combinations must be constructed to reach the needed spray areas in a yard. FIGS. 15–17 show three basic prior art T-fitting combinations that are generally in use to reach sprinkler locations.

For example, the basic unit of FIG. 15 shown by the numeral 108, uses an attaching elbow fitting 110 which has an internal threaded outlet 112 of either ½ inch or ¾ inch size. A pair of pipe clamps 104 clamp the proper length of plastic pipe 106 to the elbow and to a standard T-fitting 114. This basic prior art combination would cost Two Dollars and Twenty-five Cents ($2.25) for a ½ inch sprinkler head attachment elbow 110 and would cost Two Dollars and Thirty-five Cents ($2.35) for a ¾ inch sprinkler head attachment elbow 110 when used with a 1 inch plastic pipe 106.

In a similar manner, a prior art system may use the basic combination shown by the numeral 116 in FIG. 16 which would use the attaching T-fitting 10 (shown in FIGS. 1–2) to connect to the plastic pipe 106 being held by the pipe clamp 104. On the other end would be positioned a standard elbow fitting 118. The prior art basic combination 116, without the plastic pipe 106, would be approximately Two Dollars and Seventy-two Cents ($2.72) for a 1 inch size for use with a 1 inch plastic pipe and when using an attaching T-fitting 10 having a ½ inch female internal thread for attaching to a ½ inch sprinkler head. The same basic combination would cost approximately Two Dollars and Thirty-five Cents ($2.35) in a ¾ inch size for a ¾ inch sprinkler head.

FIG. 17 shows another prior art combination by the numeral 120, which uses a pair of standard T-fittings 114, connected to a length of plastic pipe 106 by a pair of clamps 104. This combination, without the pipe, costs approximately Three Dollars and Thirty-two Cents ($3.32) in a 1 inch size for a 1 inch plastic pipe.

The preceding three prior art combinations 108, 116 and 120 are the ones most used in present installations and it can be seen how they are more expensive than the applicant's basic unit 102, since they contain more parts and also require larger inventories of fittings as before mentioned.

Referring now to FIG. 18 there is shown a plan view of a yard area 122, shown in dashed lines, and illustrating how the prior fittings would generally be used. The water main 124 would be connected to various branches as shown to the plastic pipe 106 and the sprinkler heads 60 would be connected to the various basic units 108, 116 or 120 as shown. Because no prior 90° side outlet fitting, such as the applicant's novel fitting 94 is available on the market, the various basic prior art configurations shown in FIGS. 15–17 must be used. This often results in corner areas 126 being unwatered, resulting in dry grass in the corner area.

In distinction, FIG. 19 shows a plan view of the same yard area 122 and how the new and novel 90° side outlet 94 would be used in the basic unit 102 of FIG. 14, and how the novel T-fitting 34 would also be used to connect to the sprinkler heads 60. By comparing FIG. 18, using available prior art fittings, with FIG. 19 using the applicant's novel fittings, it becomes readily apparent that the applicant's design permits the sprinkler heads 60 to be positioned in the proper places as desired and tightly into the corners of a yard 122. This then prevents un-sprayed areas such as 126 shown in FIG. 18 when using prior art fittings in the combination shown.

Referring now to FIGS. 20–21 there will also be shown a side-by-side comparison of a yard area 128 (shown in dashed lines) with FIG. 20 representing a prior art system and FIG. 21 representing the same yard using the applicant's novel fittings. In the representations of FIG. 20 and 21 there is shown a driveway 130 dividing the yard area 128 into a smaller area 132. Here the sprinkler installer must dig under the driveway (shown by the dashed line 134) to install sprinkler heads 60 for the smaller area. Since no side outlet T-fitting is available in the prior art fittings, the installer must resort to the basic fitting groups shown in the FIG. 20 installation.

In distinction, the applicant's new and novel side outlet T-fittings 98 can be used to simplify the installation as shown in FIG. 21 along with the novel elbow fittings 90 to attach to the sprinkler heads 60. By comparing FIG. 20, using available prior art fitting combinations with the applicant's novel fittings shown in the system of FIG. 21, it becomes apparent how the applicant's basic unit simplifies installation as well as reducing the cost of the system with less expensive and fewer fittings.

From the foregoing it should be apparent that the applicant's new and novel fitting design accomplishes all of the objects and advantages of the invention as before described, and many more. The applicant's dual female outlet for attaching the fitting to a sprinkler head has never been attempted to his knowledge. In addition the use of the improved elongated barb construction, on the inlet portions of the fittings shown, greatly improves the chances that the water piping system will be installed without blowouts due to improperly clamped fittings as is common using old style prior art fittings with non-clamping areas on the inlets. This improved feature can also be used on standard types of fittings such as elbows, T's, crosses and others that are not used to attach to the sprinkler head, but are used throughout the system installation.

While the preferred embodiment has been given by way of illustration only, the applicant is not to be limited to the exact embodiment shown and described. Changes can be made in the applicant's basic design to incorporate other features and such changes are considered to be within the spirit and scope of the invention.

Having described my invention, I claim:

1. A plastic pipe fitting for use in an underground water sprinkling system using plastic pipe and a plurality of fixed, vertically upright sprinkler heads having a top surface positioned at ground level, the fitting having a central body and at least one inlet connection for connecting to the plastic pipe and at least one outlet connection for connecting the fitting to the fixed, vertically upright water sprinkler head positioned above the fitting, comprising:

(a) a central body having an internal bore therein;

(b) at least one external barbed inlet connection formed on the central body and having an internal bore connected to the internal bore in the central body; and (c) at least one fixed, vertically upright outlet connection formed on the central body, the fixed outlet connection having formed therein an internal bore connected to the internal bore in the central body and having formed therein at least two different sizes of internal connecting threads positioned one on top of the other for use in attaching the plastic pipe fitting to one of at least two different sizes of water sprinkler heads having external threads thereon as desired, the water sprinkler heads being fixedly attached to the internal connecting threads so that the water sprinkler heads can always remain in a fixed, vertical upright position on the plastic pipe fitting with the top of the sprinkler heads positioned at ground level when installed in an underground sprinkler system.

2. The fitting as defined in claim 1 wherein the fitting is constructed as a T-fitting with two barbed inlet connections and with two internal bores connecting with the internal bore in the central body.

3. The fitting as defined in claim 1 wherein the fitting is constructed as a 90° elbow with one barbed inlet connection.

4. The fitting as defined in claim 1 wherein the fitting is constructed as a 90° side outlet fitting with two barbed inlet connections with two internal bores connecting with the internal bore in the central body.

5. The fitting as defined in claim 1 wherein the fitting is constructed as a side outlet T-fitting having three barbed inlet connections and three internal bores connecting with the internal bore in the central body.

6. The fitting as defined in claim 1 wherein the barbs on the barbed inlet extend to the central body to permit the plastic pipe to be clamped anywhere along the inlet connection thereby preventing leakage at the inlet connection when improperly clamped.

7. The fitting as defined in claim 6 wherein the inlet connection barbs are nominally sized at 1 inch diameter and extend approximately 1-¾ inches from the central body and the outlet connection has formed thereon a ½ inch and a ¾ inch diameter female pipe thread.

8. In a plastic pipe fitting having a central body and of the type for use in an underground water sprinkling system using plastic pipe and a plurality of fixed, vertically upright sprinkler heads having a top surface positioned at ground level and having at least one inlet connection for connecting to the plastic pipe and at least one outlet connection for connecting the fitting to the fixed, vertically upright sprinkler heads, the improvement comprising:

(a) the inlet connection being constructed with a plurality of external connecting barbs for positioning the plastic pipe around the barbs, the inlet connection barbs extending to the central body to permit the plastic pipe to be clamped anywhere along the inlet fitting, thereby preventing leakage at the inlet connection when improperly clamped; and (b) the fixed, vertically upright outlet connection being formed with at least two different sizes of internal connecting threads positioned one on top of the other for use in attaching the plastic pipe fitting to one of at least two different sizes of water sprinkler heads having external threads thereon, the water sprinkler heads being fixedly attached to the internal connecting threads so that the water sprinkler heads always remain in a vertical upright position on the plastic pipe fitting with the top of the sprinkler heads positioned at ground level when installed in an underground sprinkler system.

9. The improvement as defined in claim 8 wherein the inlet connection barbs are nominally sized at 1 inch diameter and extend approximately 1-¾ inches from the central body and the outlet connections are ½ inch and ¾ inch diameter female pipe threads.

10. The improvement as defined in claim 8 wherein the pipe fitting is constructed as a T-fitting with two barbed inlet connections and one outlet connection.

11. The improvement as defined in claim 8 wherein the pipe fitting is constructed as a 90° elbow with one barbed inlet connection and one outlet connection.

12. The improvement as defined in claim 8 wherein the pipe fitting is constructed as a 90° side outlet fitting with two barbed inlet connections and one outlet connection.

13. The improvement as defined in claim 8 wherein the pipe fitting is constructed as a side outlet T-fitting having three barbed inlet connections and one outlet connection.

* * * * *